United States Patent [19]

Quisquater

[11] Patent Number: 5,166,978
[45] Date of Patent: Nov. 24, 1992

[54] ENCODING SYSTEM ACCORDING TO THE SO-CALLED RSA METHOD, BY MEANS OF A MICROCONTROLLER AND ARRANGEMENT IMPLEMENTING THIS SYSTEM

[75] Inventor: Jean-Jacques Quisquater, Brussels, Belgium

[73] Assignee: U.S. Philips Corp., New York, N.Y.

[21] Appl. No.: 660,197

[22] Filed: Feb. 21, 1991

[30] Foreign Application Priority Data

Feb. 23, 1990 [FR] France ............................ 90 02274

[51] Int. Cl.⁵ .............................................. H04K 1/00
[52] U.S. Cl. .................................................... 380/430
[58] Field of Search ............................................ 380/30

[56] References Cited

U.S. PATENT DOCUMENTS 5,077,793 12/1991 Falk et al. ............................ 380/30
5,101,431 3/1992 Even .................................... 380/30
5,121,431 6/1992 Wiener ................................ 380/30

OTHER PUBLICATIONS

"Fast Encryption Algorithm for the RSA Cryptographic System" S. Miyaguchi COMPCON 1982 pp. 672-678.
"Fast Computation of A*B Modulo N", P. W. Baker, Electronics Letters, vol. 23, No. 15, pp. 794-795.

Primary Examiner—Thomas H. Tarcza
Assistant Examiner—David Cain
Attorney, Agent, or Firm—Jack D. Slobod

[57] ABSTRACT

A digital message M is transformed by means of an operation to modulo-N exponentiate M by a number e all these numbers being large-length integers, having n bits, which uses a sequence of two successive operations, the first in the form of:

$$B_i = a_i \cdot X + T \cdot 2^m$$

where $B_i$ and $X$ are calculation variables, where $a_i$ is an extract of m bits of a second calculation variable A whose value results from a previous operation, which extract is taken in the decreasing order of weight of A, of rank i, and where T is a summing variable used for the calculation of the variable A, and the second operation consists of reducing the length of the variable $B_i$. A modulo-N quasi-reduction is used because it is approximative (to the nearest small multiple of N), and may be applied systematically and without a sign test during a given number of successive operations which are chosen, after which a supplementary and systematic reduction is performed according to the same method. A quotient q, approximated by default, of $B_i/N$ is used for which a format of p bits is provided which is larger than the format of m bits of $a_i$.

5 Claims, 5 Drawing Sheets

ENCODING SYSTEM ACCORDING TO THE SO-CALLED RSA METHOD, BY MEANS OF A MICROCONTROLLER AND ARRANGEMENT IMPLEMENTING THIS SYSTEM

BACKGROUND OF THE INVENTION

1. Field of the Invention

The present invention relates to a method for implementing the RSA encoding procedure or a derived procedure by means of a microcontroller, which method involves performing a modulo-N exponentiation by e of a message M; N, e and M being integers of a large length contained in an n-bit format, according to which method the calculation of the modulo-N exponentiation is broken down into two successive operations, of which the first operation has the form:

$$B_i = a_i . X + T . 2^m$$

where $B_i$ and X are calculation variables which depend on M and N, where $a_i$ is an extract of a format restricted to m bits of a calculation variable A whose value results from a previous operation, which extract is taken in the decreasing order of weight of A, of rank i, and where T is a summing variable used for the calculation of the variable A, and the second operation consists of reducing the length of the variable $B_i$ by subtracting a predetermined multiple of the modulus N, and of obtaining a new value $A_i$ for the variable A.

The present invention also relates to an arrangement implementing a method of this type.

2. Description of the Related Art

The encoding procedure termed RSA, after the names of its inventors, is specifically known from U.S. Pat. No. 4,405,829. The advantages of this procedure, especially the fact that it is of the "public key" type, are also widely known. Its implementation by means of powerful processors which have sufficiently large memories to store numbers of great lengths, does not pose any particular problems. It is different when one seeks to employ the same method by means of very small systems, and particularly by means of integrated semiconductor circuits of the microcontroller type which can be incorporated in a portable card termed smart card or also chip card. Given the fact that numerous possible and useful applications are foreseen for this type of system in the private transmission domain (authentication of a speaker, signature, exchange of keys, exchange of confidential information, electronic money etc.) considerable research has actually been made in this domain. It is an object of this research to obtain a system and means for implementing the encoding method RSA which would succeed in accomplishing data processing in a reasonable length of time (a second at the most), despite the serious restrictions imposed by the use of an integrated circuit realised according to current technologies.

With respect to the technological limitations of the current arrangements one may bring forward the small memory capacity (several hundred bytes), the low clock rate (only of the order of 8 MHz) and the small number of bits processed in parallel (8 or 16 bits only).

A system according to the introductory paragraph for implementing the RSA encoding procedure by means of a microcontroller, has been described in French Patent Specification FR-A 2 613 861.

The processing algorithm described avoids making calculations on very large numbers and for this purpose uses a fraction of the calculation variables and a modulo-N reduction after each partial multiplication, so as to avoid these variables becoming longer according as an operation is performed sequentially.

A considerable drawback of the prior-art system resides in the fact that at each modulo-N reduction stage a sign test is necessary, which determines whether the subtraction of the multiple of N has been excessive, in which case an addition by N will be performed to assign again a positive value to the calculation variable A. For that matter, such a drawback is not restricted to the case of the algorithm known from the aforementioned document, but occurs generally in the current state of the art.

Whereas the calculation operations may be performed at high speed by a special calculation element, connected in parallel to a central program management unit, operations for testing the sign can only be carried out by the central unit, and the operation of the element is thus to be interrupted while the result of the test is being awaited.

The slowing down of the processing due to the test operations in question is all the more significant as it has to occur for a large number of times during the modulo-N exponentiation, and as the operation cycle time of the central unit is comparatively slow with respect to the operation cycle time of the calculation element, typically at a ratio of 8 to 1.

SUMMARY OF THE INVENTION

Consequently, it is an object of the invention to provide a system with which it is possible to carry out an encoding operation by means of the RSA procedure with the aid of a microcontroller comprising a special calculation element, which is faster than the prior art system, especially because the sign tests or magnitude test of the calculation variables would be rendered much less frequent.

For this purpose, the system for implementing the RSA encoding procedure according to the present invention is characterised in that the second operation is carried out by means of a modulo-N quasi-reduction obtained from the equation:

$$A_i = q . N' + R$$

where N' is the twos-complement of N in the n-bit format, where q is an integer quotient in a p-bit fixed format, approximated by default, of the division $B_i/N$, with $p > m$, and where R is a variable provided by the n least significant bits of the variable $B_i$, the result $A_i$ of which operation can contain a low multiple of the modulus N and can thus present a transgression of d most significant bits with respect to the n-bit format, in that a given number of successive operations is determined as is an approximation tolerance q so that the maximum number of bits d of the transgression accumulated during said successive operations is equal to p-m, and in that an additional modulo quasi-reduction is performed after said given number of operations, which generates a new value of the variable A strictly in the n-bit format.

Since the system according to the invention provides the use of a quotient q approximated by default, the reduction of the length of the variable $B_i$ may never produce a result having a negative sign and it is thus no longer necessary to test this sign. The operation may thus be carried out in a systematic and uninterrupted manner, at least for a certain number of successive operations after which one might run the risk that the accumulation of the transgression can no longer be taken into account in the p-bit format of the quotient q.

In effect, the use of an approximated quotient value q leads to a possibility of an incomplete modulo reduction with which it is possible to produce a result $A_i$ of which the number of bits transgresses the n-bit format determined at the beginning. Therefore, a p-bit format has been chosen for the approximated quotient q, which is larger than the m-bit format used for the multiplier $a_i$ in the operation $a_i.X$.

The predetermined number of operations performed successively, while the transgression of the variable $A_i$ may increase, is advantageously chosen to be equal to the number of multiplications $a_i.X$ followed by their modulo-N quasi-reductions which are necessary for fully using the variable A by means of its successive extracts $a_i$. This number corresponds to the higher integer of the ratio n/m.

According to the invention, the approximated quotient q which has the degree of precision searched for, can be determined in various ways.

A first way of implementing the invention, in which the value of the modulus N is taken in a particular interval, is characterised in that said particular interval is equal to:

$$2^n - 2^{(n-m)}; 2^n - 1$$

and in that the value of the approximated quotient q is provided by the most significant bits of the variable $B_i$ which transgress the n-bit format.

According to this implementation, the approximated quotient q is found immediately and can be reprocessed in the specific processor as can the operand for the modulo-N reduction without even passing through a data memory. The corresponding memory location can thus be saved.

When this type of implementation is applied to n-bit variables, where n is lower than 2000, one advantageously chooses a number of bits p of the approximated quotient q equal to 32 and a number of bits m of said reduced format of the variable $a_i$ equal to 24.

These numbers of bits are multiples of 8, and are well adapted to a microcontroller operating with 8-bit words to which controller is associated a calculation element also working with 8-bit operands. The value p-m is equal to 8 bits (that is, one byte) which permits receiving the total transgression which results from a modulo-N reduction which may be incomplete until an additional reduction is carried out.

By restricting the interval in which the value of modulus N is chosen, one could also augment the number of successively connected operations before an additional modulo quasi-reduction becomes necessary.

Conversely, the interval in which the value of the modulus N is chosen could also be enlarged, providing that the number of successive operations which are linked are reduced correlatively without an additional modulo reduction.

The system according to the invention is also applied when the value of the modulus N is chosen in whatever manner from the number of n bits.

In effect, a second way of implementing the invention which applies to such a case, for n-bit variables where n is less than 2000, is characterised in that one chooses a number of bits p of the approximated quotient q is chosen to be equal to 32, and a number of bits m of said reduced format of the variable $a_i$ to be equal to 24, in that the value of the approximated quotient q is determined after completion of the first operation:

$$B_i = a_{io}.X + T.2^m$$

by means of an additional operation:

$$l_i.N^*$$

in which $l_i$ represents the most significant bits of the variable $B_i$ exceeding the n-bit format, and $N^*$ represents a binary number limited to its 56 most significant bits of the inverse of modulus N, the result of which additional operation, limited to its 32 most significant bits, produces the value of the approximated quotient q, and in that, finally, the modulo-N quasi-reduction is performed by means of the above operation:

$$A_i = q.N' + ^*R$$

The value N may be calculated in advance and fed to the microcontroller as a data in the same capacity as N or N'. The value of the approximated quotient q is determined at the end of a small additional operation (multiplication by two numbers, one by 4 bytes and the other by 7 bytes), which is of the same type as the modulo-N reduction but much shorter because the multiplicand is only 7 bytes. Since any number may simply be chosen for N, which need not be situated in a predetermined interval as in the first embodiment, the duration of the operation is extended by only about 15%.

The invention also relates to an arrangement comprising a program-controlled central microcalculator unit characterised in that this program implements the method defined above.

BRIEF DESCRIPTION OF THE DRAWING

Other characteristic features, details and advantages of the invention will be made clear with the aid of the following description with reference to the annexed drawing, in which.

DETAILED DESCRIPTION OF THE PREFERRED EMBODIMENTS

The so-called binary exponentiation methods consisting of calculating the value of $M^e$ are well known. One of them in which the index e is used in a regressive order of weight will be mentioned very briefly here in order to fix the notations and provide a better understanding of the hierarchy of the calculations.

Figure 1:
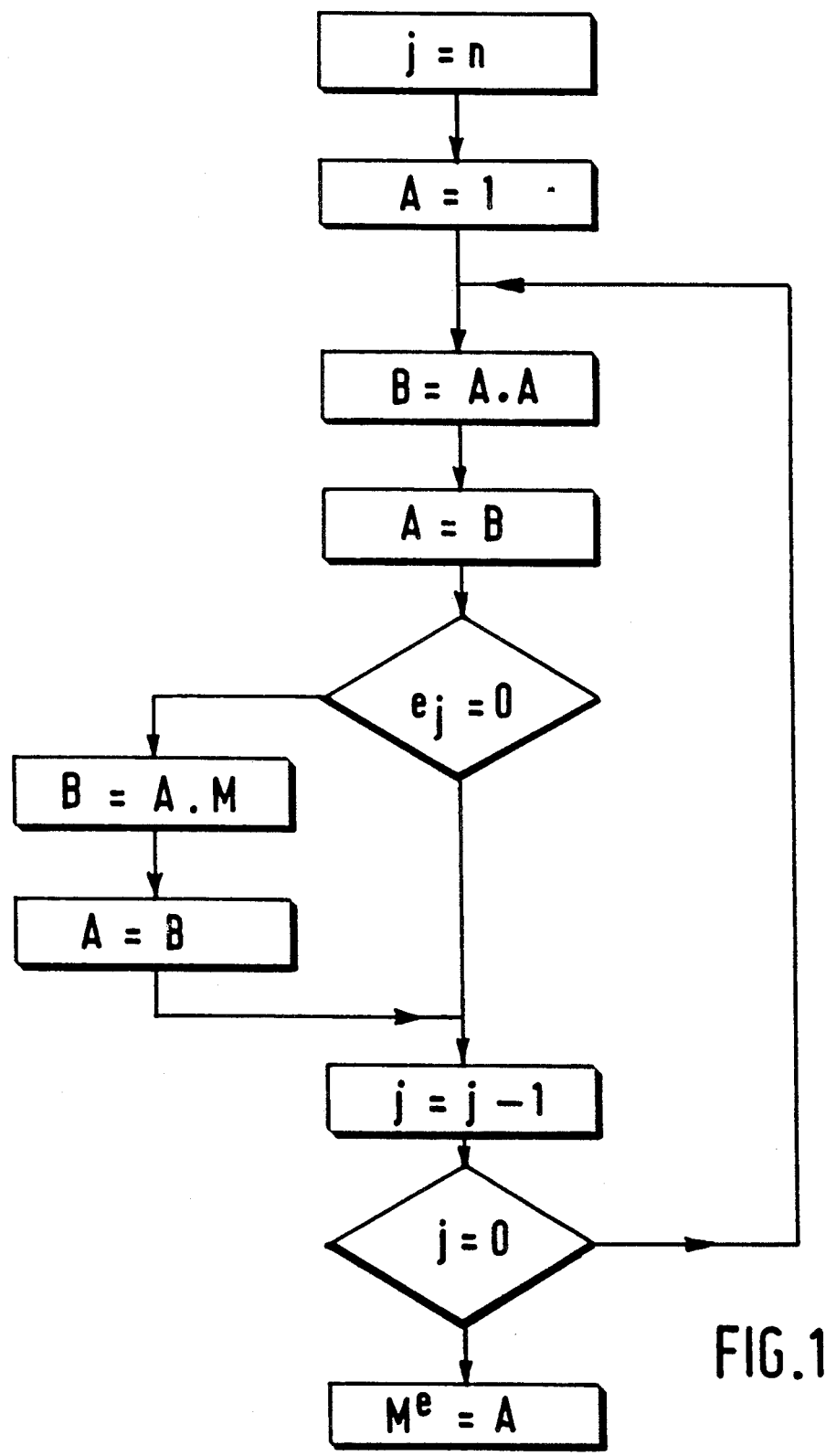
FIG. 1 represents a calculation algorithm of the exponentiation by e of an n-bit word M, where e is also a number of n-bits.

An index j=n is determined, where n is equal to the number of bits of the index e expressed as a binary number, and a calculation variable A initialized at the value 1. Subsequently, a calculation loop is made in which squared A is placed under the variable B, then a new value of A=B is given and if the bit of index e of rank j is equal to 1 an additional operation is carried out consisting of writing B=A.M in which the value of B is reset under the value of the variable A whereas if the bit of e of rank j is equal to 0 this operation is omitted. Then, one passes to the bit that has a value just inferior to e by assuming j=j−1, after which the operations are relooped as indicated in FIG. 1. The operations are performed as long as j exceeds 0. The least significant bit of e is used for j=1, which is to say that if j=0 the calculation will be terminated and the calculation variable A will have the value of $M^e$.

The RSA encoding procedure consists of performing the modulo-N exponentiation by e of a message M; N, e and M being large length integers included in a format having n bits, where n may be of the order of 512 bits.

A first effect of the modulo-N function is that the result is reduced to a format that does not exceed n bits. Another property of the modulo-N function is that one may choose the moment at which the modulo-N reduction is applied without having a detrimental effect on the final result, which presents the advantage of reducing the length of the calculation variable before it reaches a length which is prohibitive for a microcontroller whose calculation capacity and memory size are very restricted.

Figure 2:
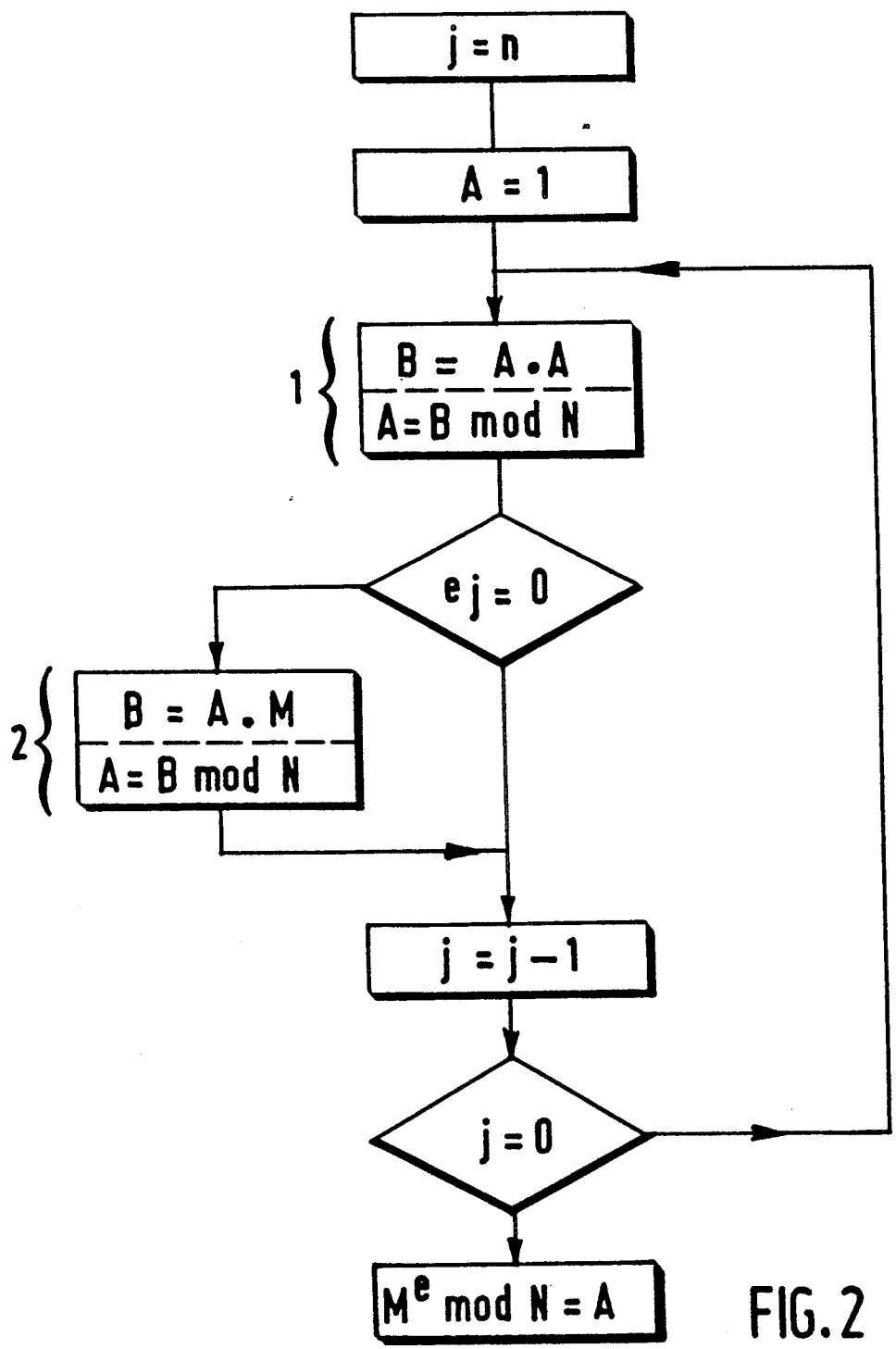
FIG. 2 represents an algorithm derived from that of FIG. 1, which makes it possible to come to the value of $M^e$ modulo-N, where N is an n-bit modulus.

FIG. 2 shows how the algorithm of FIG. 1 may be modified so as to obtain the modulo-N exponentiation by e of a message M. The calculation process is initiated as before, by assuming j=n and A=1, and the calculation of B=A.A is made, which may thus be reduced to a new value of the calculation variable A by assuming A=B modulo-N. If bit e of rank j is assumed to be equal to 1, B=A.M which is again reduced by assuming A=B modulo-N. If the bit e of rank j is equal to 0, this double operation is omitted. Thus a specific value of the variable A is obtained when this calculation stage is initiated, after which j=j−1 is effected and these looped operations as indicated in FIG. 2 are repeated until the variable of index j is equal to 0. If one has used the bits of the variable e one by one, the calculation variable A thus produces the value searched for of $M^e$ modulo-N. It may be observed with respect to FIG. 2 that the pairs of operations referenced 1 and 2 are of an identical nature. For the operations of each pair, the first one is of the type B=A.X, whereas the second operation is of the type A=B modulo-N. As in the first operation of the type B=A.X, where A and X are large-length numbers, it is generally not possible to have this operation carried out directly by means of a microcontroller which has little calculation capacity. In reality, the pairs of operations mentioned hereinbefore will be carried out by means of interleaved fractions, so that the length of the variables does not progress much with respect to the n-bit format.

The sequential process by which it is possible to obtain an equivalent result of the pair of operations referenced 1 and 2 in FIG. 2 will now be dicussed in greater detail.

Figure 3:
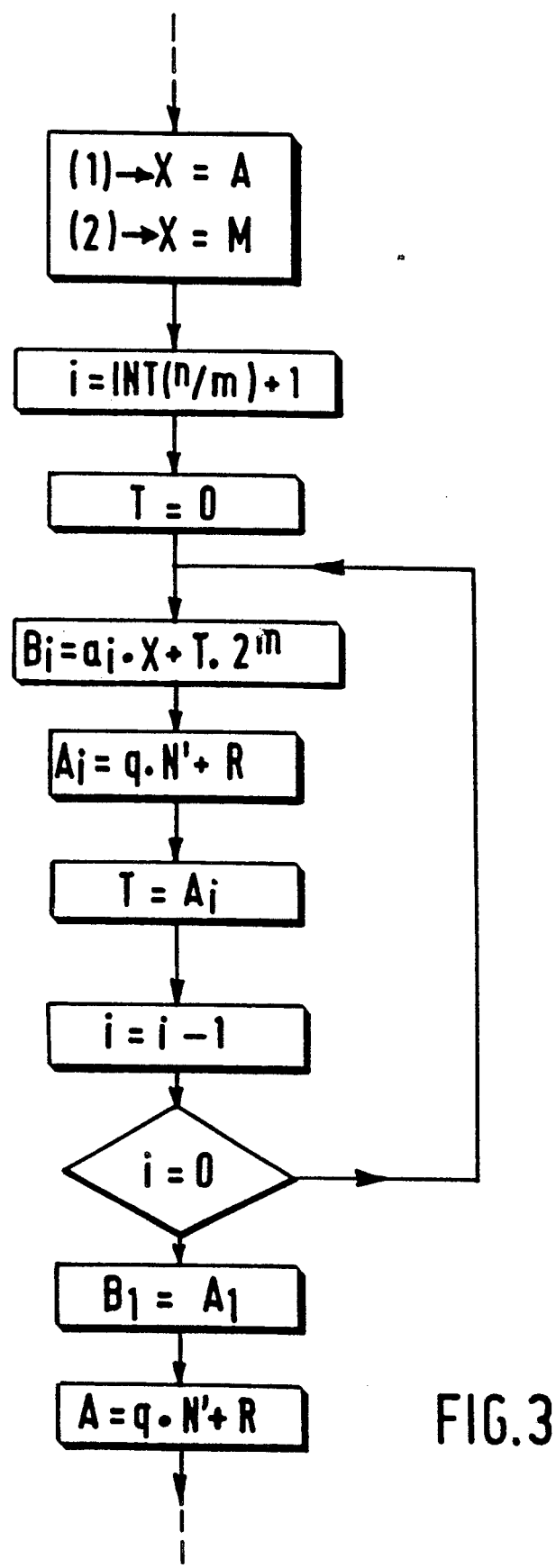
FIG. 3 represents part of the algorithm shown in FIG. 2 in a more detailed development according to which the invented system operates.

FIG. 3 shows a more detailed algorithm which is similar to the pair of operations 1 and 2 mentioned hereinbefore. To the variable X a value will be assigned which is equal to either A or M, depending on whether it is an operation of the type 1 or 2. Knowing that the calculation variable A will be used in segments or extracts having the restricted format $a_i$ of n bits, a loop index i will consequently be determined of which the value is equal to the rounded off integer of the division n/m. A totalling variable T is used which is initialized at 0. Based on the most significant segment corresponding to the extract $a_i$ of the variable A, a calculation loop is made in which $B_i = a_i.X + T.2^m$ is calculated, after which a reduction of the length of the variable $B_i$ is made according to the equation $A_i = q.N' + R$.

According to the invented method the current value of the variable $A_i$ represents a new value of the variable $B_i$ from which a predetermined multiple of the modulus N is subtracted, thus reducing the length of the variable $B_i$. This operation is apparent from the modulo-N function but since this reduction may be incomplete it was previously called a modulo-N quasi-reduction because the variable $A_i$ could contain a small multiple of the modulus N. A variable R is determined whose value is provided by the n least significant bits of the variable $B_i$, and q is a quotient approximated by default of the division $B_i/M$ in a fixed format having p bits, where p exceeds m. The value of the variable N' is the two's-complement of N in the n-bit format. The term q.N' is thus equivalent to the term −q.N. Because the value $A_i$ can still contain a small multiple of the modulus N (contrary to the strict operation of modulo-N reduction), this result $A_i$ is thus likely to present a transgression of d most significiant bits with respect to the n-bit format. Therefore, a format for the variable q having p bits has been chosen, while the number p exceeds the number m so that it can contain the transgression d in question.

One assigns to the variable T the current value of the variable $A_i$ after which one diminishes by unity the loop index i and repeats the operation in the loop represented in FIG. 3 until the last extract $a_i$, having little significance, has been used. A given number of successive operations in the loop indicated in FIG. 3 is determined as well as an approximation tolerance q so that the maximum number of bits d of the transgression accumulated during said successive operations is equal to p-m. In the example represented in FIG. 3 said number of successive operations is equal to i, which simultaneously determines the approximation tolerance q. When the calculations of i in the loop i are started, the last result $A_i$ becomes the result $A_1$ which is placed under the variable $B_1$. Then an additional modulo-N quasi-reduction is performed which is identical with that performed in the calculation loop and which produces a new value of the calculation variable A by performing the operation $A = q.N' + R$ in which equation the variables have the same significance as before and produce a reduction of the length of the variable $B_1$, which makes all transgression disappear and reduces this variable to an n-bit format. In the algorithm represented in FIG. 3 a condition i=0 occurs. In reality it is not really a matter of a test here (in the data processing sense of the term), because in practice one has initiated the calculation arrangement in performing the algorithm of FIG. 3, by specifying therein the number i of loops of operations to be performed. Finally, this algorithm does not present any sign test or test of magnitude and is performed systematically by means of a special calculation element, as will be seen in the sequel, without the necessity of an interruption at the command of the central microprocessor unit.

The value of the approximated quotient q having the required degree of precision, can be determined in various ways.

A first manner of implementing the invention in which the value of the modulus N is taken in a particular interval is characterised by the fact that this particular interval is equal to:

$$2^n - 2^{(n-m)}; 2^n - 1$$

and in that the value of the approximated quotient q is produced by the most significant bits of the variable $B_i$ which transgresses the n-bit format.

According to an advantageous embodiment in which n is less than 2000, a number of bits p is chosen from the approximated quotient q which is equal to 32 and a number of bits m from the reduced format of the variable $a_i$ which is equal to 24. One thus has 8 bits (1 byte) for accommodating the transgression d which may occur under very unfavourable circumstances during the loop calculation process which is repeated i times. It should be observed that in the calculation $B_i = a_i.X + T.2^n$, the term $a_i.X$ always remains strictly within a format having (n+m) bits whereas it is the value $T.2^m$ that may transgress such a format and make a transgression d appear. Because this transgression arises during the addition, there is one byte for accommodating the cumulative total of this transgression during the i loop calculations and, consequently, one has 255 bits for cumulating such a transgression whereas such a transgression has generally a value of 1 in a disadvantageous case, 2 at the most and 3 in exceptional cases (not more than once). This narrows down to the fact that one has a number of loop cycles > 100 before the transgression can no longer be accommodated by the byte which is reserved for this purpose. For indicative purposes for the initial variables for which n is equal to 512 bits, the number i of loop calculations is equal to no more than 22.

As will be noticed in the sequel the numbers of bits indicated by way of example are multiples of 8 bits and are advantageous because they are well adapted to a microcontroller operating with 8-bit words to which a calculation element also operating with 8-bit operands is associated.

In the foregoing an example has been given for which the number of successive operations performed without having to revert to an additional modulo-N quasi-reduction is equal to i, that is to say, the number of successive operations necessary for using the variable A with the aid of its successive extracts $a_i$. However, a different operation could also be performed, for example, by enhancing the precision of the approximated quotient q by choosing a more restricted interval of the modulus N, which thus makes it possible to reduce the number of bits p-m reserved for accommodating the format transgression of the calculation variable A, or in contradistinction thereto, by enlarging the particular interval in which the value of the modulus N has been chosen, which will lead to either increasing the number of bits p to be used for accommodating the variable q or, rather, while maintaining a value p at 32 bits, by reducing the number of successive connected operations (that is to say, by performing an additional modulo-N quasi-reduction for a certain number of times during the i loop calculations). It is advantageous in all cases for retaining a constant calculation format for the variable A, to terminate the operation cycle described with reference to FIG. 3 by an additional modulo-N quasi-reduction which has for its object to bring the value of the variable A strictly back to the n-bit format.

The system according to the invention can be immediately used when the value of the modulus N is taken in a particular interval. But it is also used when the value of the modulus N is chosen arbitrarily from the number of n bits. In effect, according to a second embodiment of the invention, a small additional operation enables to determine the value of the approximated quotient q which has the proper approximation tolerance.

Because the magnitudes of the calculation varibles are generally correlated with one another, this embodiment will be described with the aid of an example for which these variables possess a format whose value is numerically fixed. The number of bits n of the long words is less than 2000, the number of bits p of the approximated quotient q is equal to 32, the number of bits m of the reduced format of the variable $a_i$ is equal to 24. The calculation method depicted in FIG. 3 is also used so that the first of the operations performed in a loop is given by $B_i = a_i.X + T.2^m$.

The value of the approximated quotient q can no longer be produced directly by the most significant bits of the variable $B_i$ which transgress the n-bit format. The word $l_i$ represented by these most significant bits transgressing the n-bit format is nevertheless used indirectly after transformation by a small operation for producing the value of the approximated quotient q. As, according to the invention, an approximation tolerance of the approximated quotient q is permitted, the transformation which will be discussed in the sequel will no longer require a great precision and may be effected with a reduced number of bits.

According to this embodiment of the invention the product $l_i.N^*$ in which $N^*$ is a variable constituted by a binary number restricted to its 56 most significant bits (7 bytes) of the inverse modulus N. The value resulting from this multiplication is again restricted to its 32 most significant bits (4 bytes), which value provides the approximated quotient q searched for. At the end of this operation the length of the variable $B_i$ is reduced as before by means of $A_i = q.N' + R$, in which operation the variables have the same significance as in the preceding embodiment.

It should be observed that the value $N^*$ is a parameter which may be applied to the microcontroller in the same capacity as the modulus N or its two's-complement N' so that this parameter is not of necessity calculated by the microcontroller itself. Finally, as easily as one may now choose the modulus N to have an arbitrary value out of the numbers of n bits, one uses the same method as before with the exception of a small additional operation for determining the value of the approximated quotient q, which operation is comparatively short because it results in a multiplication of two numbers of which one has a 4-byte format and the other a 7-byte format, which additional operation enhances by only about 15% the duration of the operation as compared to a first embodiment in which the value of the modulus N was chosen in a particular interval.

With respect to this example in which the formats of the variables have been fixed numerically, an example presenting a preferred practical embodiment, it will be understood that the expert is capable of determining other measures concerning the precision with which the approximated quotient q can be calculated such as the modulo-N quasi-reduction method, performed in the manner described before, systematically, and without a test during a predetermined number of successive operations after which an additional modulo-N quasi-reduction is performed so as to suppress the transgression accumulated during these successive operations.

Figure 4:
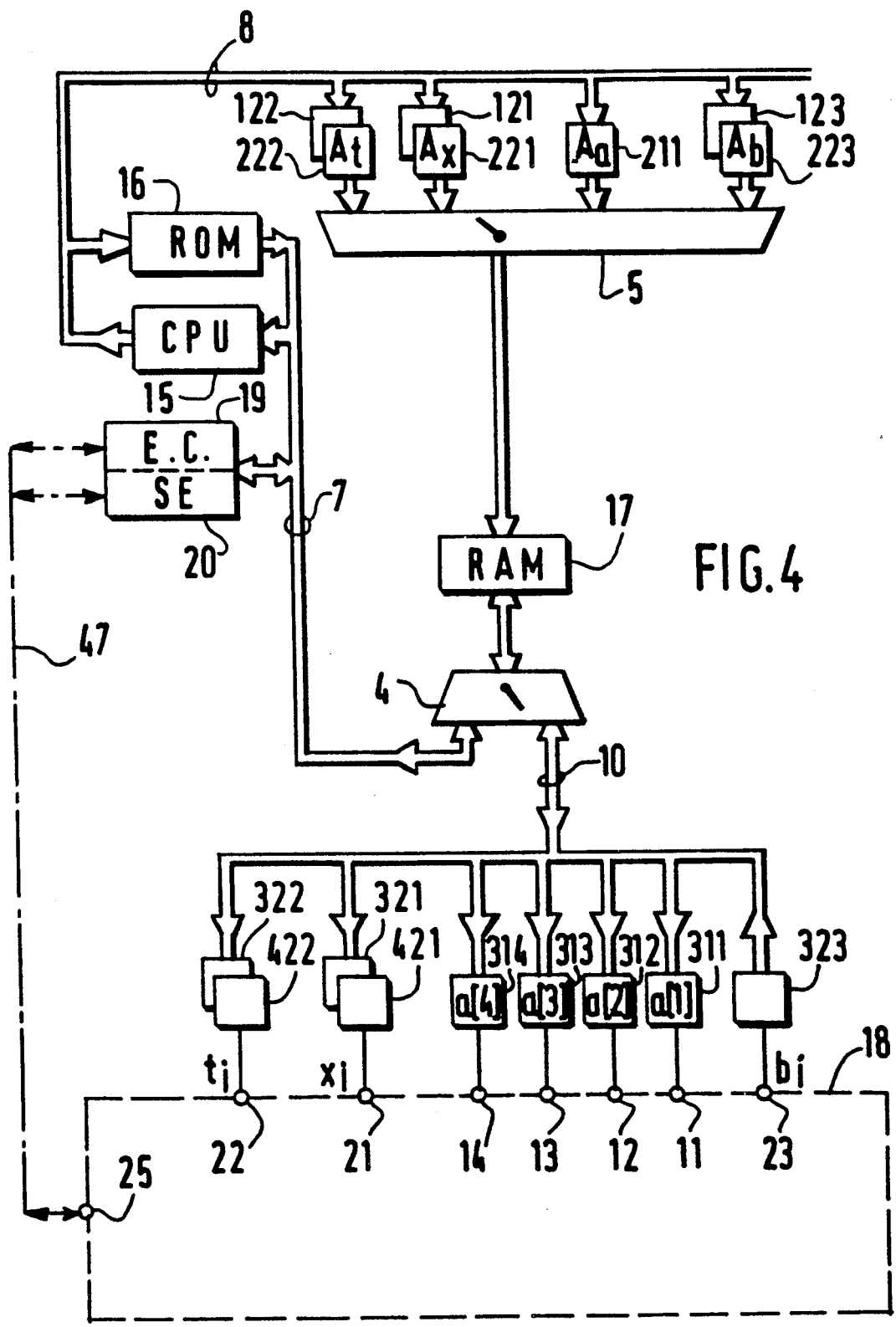
FIG. 4 presents a block diagram showing the organisation of a microcontroller which implements the method according to the invention.
Figure 5:
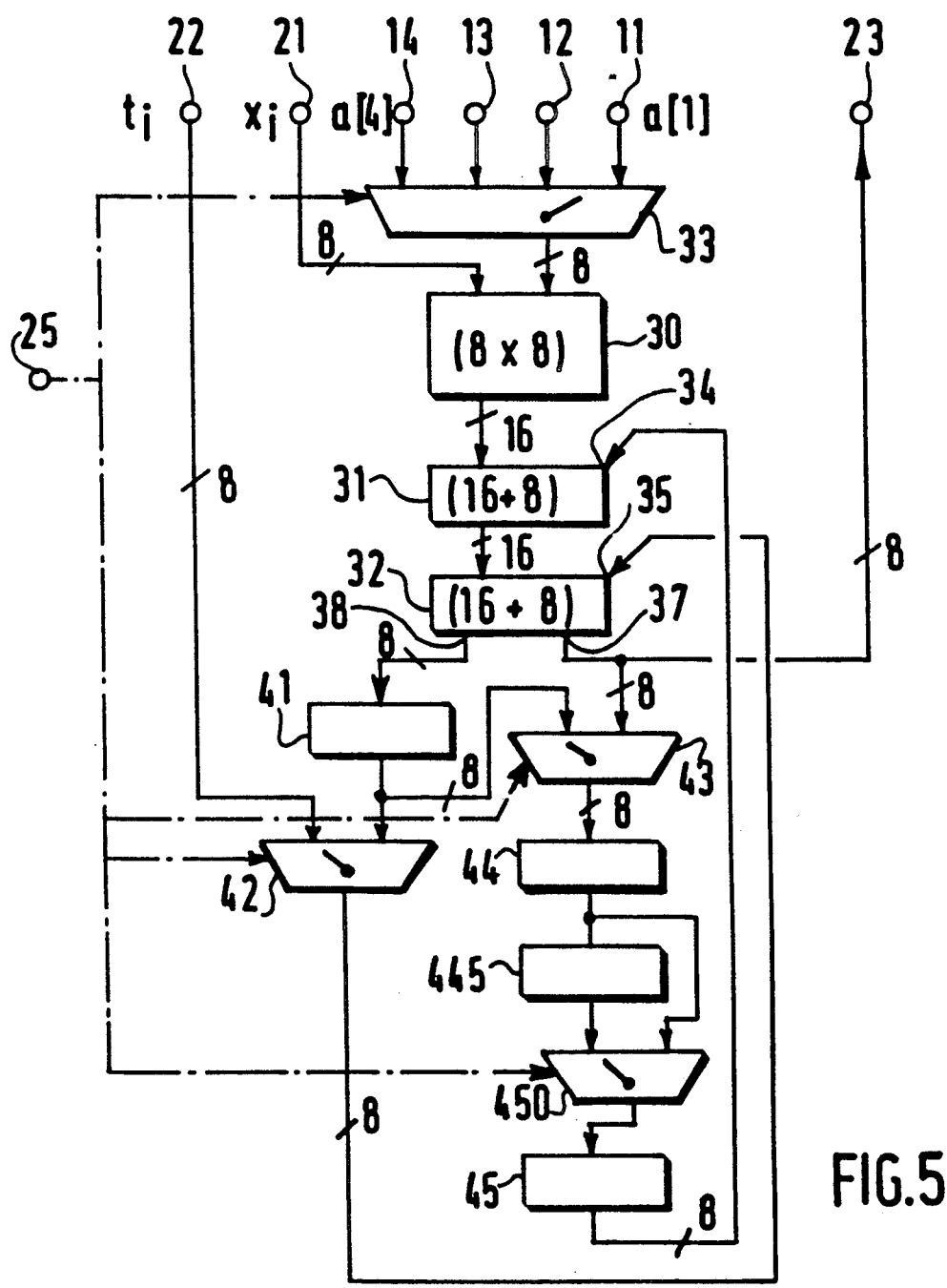
FIG. 5 shows a schematic diagram of a calculation element which allows being incorporated in the microcontroller of FIG. 4.

With the aid of FIGS. 4 and 5 an embodiment of a microcontroller will now be briefly described which permits an advantageous and effective use of the system according to the invention and an embodiment of a calculation element which can be incorporated in such a microcontroller. It should be observed that these arrangements themselves form the object of French Patent Specifications Nos. 8917455 and 8917456 filed Dec. 29, 1989, in which specifications these arrangements are described in more detail.

The microcontroller shown schematically in FIG. 4 comprises a central processor (CPU 15), a read only memory (ROM 16), a random access memory (RAM 17), a calculation element symbolized by the broken-line rectangle 18, as well as a circuit comprising state and control registers (E.C.) 19, and a sequencer (SE) 20. The central processor 15 exchanges data with the read only memory 16, the state and control unit 19, the sequencer 20 over a data bus 7 and transmits addresses to the read only memory 16 over an address bus 8. The central processor 15 may also exchange data and addresses over the respective buses 7 and 8 with the random access memory 17, but the accesses to the random access memory 17 are not direct.

The data bus 7 which is connected to the central processor 15 accesses the data part of the random access memory 17 through a first input of a data switch multiplexer 4, whose second input is connected to a bus called "local bus" 10, whose role will be explained hereinafter. The address port of random access memory 17 is connected to the output of another multiplexer called address switch 5, whose four inputs are connected to the address bus 8 respectively: for the first input, via a double address register 122-222 for an operand t, which double register is arranged as a serial queue, for the second input via another double register 121-221 also arranged as a serial queue for the address of an operand X, for the third input via a simple register 211 for the address of an operand a □ and finally, for the fourth input, via another double register 123-223 for the address of an operation result b. The address pointer registers 122, 121, 211, 123 may be loaded by the central processor 15 whereas the pointer registers 222, 221 and 223 are arranged for receiving the addresses of their counterpart registers in each of the corresponding queues and can thereafter be incremented or decremented automatically by the sequencer 20. The simple pointer register 211 may also be incremented or decremented automatically by the sequencer after loading by the central processor 15.

The calculation element 18 has four inputs 11, 12, 13 and 14 for operands a[1], a[2], a[3] and a[4] as well as inputs 21 and 22 for the respective operands $x_i$ and $t_i$. Between the local bus 10 and the operand inputs 11, 12, 13, 14 the respective registers 311, 312, 313 and 314 are inserted in which the values of the operands mentioned above are stored. Between input 21 of operand $x_i$ and the local bus 10 a pair of registers 321-421 arranged as a serial queue are inserted, and so are a pair of registers 322-422 arranged as a serial queue between the input 22 of the operand $t_i$ and the local bus 10. The calculation element 18 further has an output 23 for a result $b_i$ which is transmitted to the local bus 10 via an output register 323. For clarity of the Figure, the control connections have not been represented in detail. However, a set of control connections 47 represented by way of a dash-and-dot line indicates symbolically the control connections between the state and control register circuit 19, the sequencer 20 and the calculation element 18 which receives these commands through a port 25.

The particularity of the microcontroller represented in FIG. 4 mainly resides in the fact that owing to the local bus 10, data may be transmitted via the data switch multiplexer 4, between the random access memory 17 and the data ports of the calculation element 18, and thus this element may perform a series of calculations under the control of the sequencer 20 without the intervention of the central processor 15. During this series of operations the central processor can reload the address pointers into the pointer registers 121, 122 and 123 with a view to a series of subsequent calculations.

In a practical embodiment of the method according to the invention all the processed data are presented in a uniform 8-bit format. The calculation variables T and X are segmented into 8-bit words which, with a rank of weight i, constitute the operands $x_i$ and $t_i$. For a given value pair $x_i$, $t_i$ these values are first loaded into the registers 321 and 322 over the local bus 10 into two clock cycles. A third clock cycle is used for writing into random access memory 17 a result $b_i$ stored in the register 323. The calculation element 18 can operate in cycles consisting of 4 steps using the operands a[1] to a[4] or also in cycles of 3 steps, in which the operand a[4] is not used and the input 14 is not used either.

In order to carry out an operation of the type $B_i = a_i \cdot X T$ the calculation element 18 is used in 3-step cycles, the operands a[1] to a[3] representing three successive bytes which together form the three bytes of the variable $a_i$. The calculation element 18 can produce a unique result $b_i$ at the end of the 3-step calculation cycle which narrows down to performing the operation $a_i \cdot x_i + t_i$. During the clock cycle in which a result $b_i$ is transferred from the register 323 to the random access memory 17, new values of the operands $x_i$ and $t_i$ are simultaneously transferred from the respective registers 321 and 322 to the corresponding registers 421 and 422. Since each of the calculation variables T, X, and $B_i$ is stored in the random access memory 17 by means of consecutive address bytes, these addresses are pointed by the respective pointer registers 221, 222 and 223 by means of incrementation or decrementation under the control of the sequencer 20.

When a modulo-N quasi-reduction is performed according to the equation $A_i = q \cdot N' + R$, at input 21 the operand $x_i$ will be replaced by a byte $n'_i$ of the parameter N' taken of rank i, at input 22 the operand $t_i$ will be replaced by a byte $r_i$ derived from the variable R, and to the four inputs 11, 12, 13, 14 the 4 successive bytes will be applied which together form the approximated quotient q. Calculation element 18 thus operates in 4 steps cyclically effecting the processing of each of the bytes which together form the quotient q for a pair of values $n'_i$ and $r_i$. A calculation is performed at each of the 4 steps of the cycle while the local bus 10 is again occupied for the duration of two clock cycles to reload operand data into the registers 321 and 322 and one clock cycle for transferring the result from register 323 to the random access memory 17. In this case the local bus 10 remains unoccupied for one in 4 clock cycles which together form a calculation cycle.

For a format of initial variables N, M, of 512 bits, that is to say, 64 bytes, 67 cycles of 3 steps each are to be performed in order to use completely, in bytes that is, the variables X and T with which it is possible to obtain a result $B_i$. In a similar manner, 68 cycles of 4 steps will be needed to use completely, in bytes that is, the variables N' and R (inclusive of the "clearing" of the intermediate data stored in the calculation element) in the modulo-N quasi-reduction operation which produces the calculation variable $A_i$. During the period of time corresponding to these series of cycles during which the calculation element operates in an almost autonomous manner, the central processor 15 has all the necessary time to re-load into the pointer registers 121, 122 and 123 the various parameters necessary for the calculations which are to follow and, more specifically, the addresses. In a similar manner, between two series of calculation cycles, new operands a[1], a[2], a[3]—and if necessary an operand a[4]—are re-loaded into the registers 311 to 313 (314) on the basis of an initial address loaded by the central processor into the pointer register 211, which is then decremented or incremented to fetch the next values of these operands from the random access memory 17. A variant of the embodiment (not shown in FIG. 4), consists of adding to a data register 323 which receives the output result $b_i$, a bank of three buffer registers that can be short-circuited by means of a multiplexer. The most significant bytes of the variable $B_i$ produced on the last occasion by the calculation element 18 may thus, in response to the bank of 3 augmented buffer registers of said bank extended by register 323, be transferred directly and successively to the registers 311, 312, 313 and 314 as operands for employing a modulo-N quasi-reduction thereupon. In this manner the memory space for these 4 data bytes is no longer necessary.

FIG. 5 shows the internal diagram of a calculation element of FIG. 4. The inputs and outputs of this calculation element are referenced by the same characters as in FIG. 4. The data inputs 11 to 14 are applied to 4 inputs of a cycle switch multiplexer 33 whose output signal is applied to one of the two inputs of an 8-by-8 bit multiplier 30. The second input of the multiplier receives the operand $x_i$ from input 21. The output of the multiplier 30 having a 16-bit format is applied to one of the two inputs of a first adder 31 whereas a second input, which has an 8-bit format, is fed by data recycling means which will be described hereinafter. The 16-bit format output of the first adder 31 is applied to one of the two inputs of a second adder 32, of 16+8 bits, whose second input 35 can receive the operand value $t_i$ from input 22 via a multiplexer 42. The second adder 32 has two result outputs: an output 37 of the 8 least significant bits, which can be transmitted to output 23 and an output 38 of the 8 most significant bits, which feed buffer register 41. The output of buffer register 41 is applied on the one hand to the second input of multiplexer 42 and on the other hand to second multiplexer 43, the other 8-bit input of this second multiplexer being fed by output 37. The 8-bit output of multiplexer 43 is connected to the second input 34 of the first adder 31 via a bank of buffer registers 44, 445, 45. One of the registers of this bank (in this case register 445) can be bypassed by means of short-circuit multiplexer 450. The data pass through this bank of registers step-by-step.

In the first step of a cycle corresponding to the selection of the operand a[1], the multiplexer 42 selects the operand input $t_i$ and the multiplexer 43 selects the buffer register 41. These symbolized by small arrow in FIG. 5. The operand $t_i$ is also fed to second adder 32 and the 8 least significant result bits at output 37 of this adder are stored in register 323 (FIG. 4) via output 23. For the further steps after the first cycle-step, the positions of the multiplexers 42 and 43 are reversed so that the most significant values of the results at output 38 of the second adder 32 are retrocoupled to input 35 of the second adder 32 after a delay which corresponds to the dwell time of these values in the buffer register 41. The 8 least significant bits at result output 37 of the second adder 32 are transferred to register 44 which constitutes the head of the bank of registers where the values are successively transferred to the register that follows each step. A convenient delay of 3 steps is thus ensured for again feeding these values to input 34 of the first adder 31. By way of exception, at the last step of a cycle, the value contained in the buffer register 41 is transferred during the first step of the next cycle to buffer register 44 and thus provides for this value a recycling after a delay of 4 steps, as is suitable, to the input 34 of the first adder 31.

Such a calculation element thus produces a single result of 8 bits at the output 23 in 4 cycle steps, exploiting the operands a[1] to a[4] combined with the operands $x_i$ and $t_i$. Intermediate results are recycled even within this very element by recycling means constituted, in essence, by the registers 41, 44, 445 and 45 which comprise recycling switching means constituted by the multiplexers 42 and 43.

Such an element is also capable of operating in cycles of 3 steps. In this case an information signal in the form of a particular bit 1, loaded by the central processor 15 into the state and command register 19, commands the calculation element not to use the operand a[4] so that the cyclic switching of the multiplexer 33 is restricted to using the operands a[1] to a[3]. In order to ensure a correct recycling of the intermediate data, the bank of buffer registers 44, 445, 45 is reduced by one register in that multiplexer 450 now shortcuts register 445.

It will be simple to comprehend that the microcontroller described with respect to FIG. 4 comprising a calculation element as described with respect to FIG. 5 is capable of implementing efficiently the method according to the invention for an encoding by means of the RSA method. When proceeding in this manner, a considerable number of tests which may significantly delay the operation are omitted.

The invention can be extended to any arrangement comprising a central microcalculator unit controlled by a program, in which arrangement this program implements the method described hereinbefore.

What is claimed is:

1. Method for implementing an RSA encoding procedure using a microcontroller comprising performing a modulo-N exponentiation by e of a message M; N, e and M being integers contained in an n-bit format, according to which method the calculation of the modulo-N exponentiation is broken down into two successive operation, of which the first operation has the form:

$$B_i = a_i \cdot X + T \cdot 2^m$$

where $B_i$ and X are calculation variables which depend on M and N, where $a_i$ is an extract of a format restricted to m bits of a calculation variable A whose value results from a previous operation, which extract is taken in the decreasing order of weight of A, of rank i, and where T is a summing variable used for the calculation of the variable A, and the second operation comprises reducing the length of the variable $B_i$ by subtracting a predetermined multiple of the modulus N, and of obtaining a new value $A_1$ for the variable A, characterised in that the second operation is carried out by means of a modulo-N quasi-reduction obtained from the equation:

$$A_i = q.N' + R$$

where N' is the twos-complement of N in an n-bit format, where q is an integer quotient in a p-bit fixed format, approximated by default, of the division $B_i/N$, with p>m, and where R is a variable provided by the n least significant bits of the variable $B_i$, the result $A_i$ of which operation can contain a multiple of the modulus N and can thus present a transgression of d most significant bits with respect to the n-bit format, in that a given number of successive operations is determined as is an approximation tolerance q so that the maximum number of bits d of the transgression accumulated during said successive operations is equal to p-m, and in that an additional modulo quasi-reduction is performed after said given number of operations, which generates a new value of the variable A strictly in the n-bit format.

2. Method as claimed in claim 1, characterised in that said fixed number of successive operations is reached when the variable A has been fully used by means of its extracts $a_i$.

3. Method as claimed in claim 2, in which the value of the modulus N is taken in a particular interval, characterised in that said particular interval is equal to:

$$2^n - 2^{n-m}; 2^n - 1$$

and in that the value of the approximated quotient q is provided by the most significant bits of the variable $B_i$ which transgress the n-bit format.

4. Method as claimed in claim 3, applied to n-bit variables where n is less than 2000, characterised in that a number of bits p of the approximated quotient q is equal to 32 and a number of bits m of said reduced format of the variable $a_i$ is equal to 24.

5. Method as claimed in claim 2, applicable when the value of the modulus N is chosen in whatever manner from the number of n bits and for the n-bit variables where n is less than 2000, characterised in that a number of bits p of the approximated quotient q is chosen to be equal to 32 and a number of bits m of said reduced format of the variable $a_i$ to be equal to 24, in that the value of the approximated quotient q is determined after completion of the first operation:

$$B_i = a_i.X + T.2^m$$

by means of an additional operation:

$$l_i.N^*$$

in which $l_i$ represents the most significant bits of the variable $B_i$ exceeding the n-bit format, and $N^*$ represents a binary number limited to its 56 most significant bits of the inverse of modulus N, the result of which additional operation, limited to its 32 most significant bits, produces the value of the approximated quotient q, and in that finally the modulo-N quasi-reduction is performed by means of the above operation:

$$A_i = q.N' + R$$

mentioned hereinbefore.

* * * * *